United States Patent

Kobayashi et al.

[11] Patent Number: 5,815,486
[45] Date of Patent: Sep. 29, 1998

[54] OPTICAL DISK, RECORDING/ REPRODUCING APPARATUS AND METHOD FOR RAPIDLY RECORDING/REPRODUCING DATA ON/FROM AN OPTICAL DISK USING GRAY CODING

[75] Inventors: Shoei Kobayashi, Kanawaga; Toru Takeda, Saitama; Tamotsu Yamagami, Kanagawa, all of Japan

[73] Assignee: Sony Corporation, Tokyo, Japan

[21] Appl. No.: 704,020

[22] Filed: Aug. 28, 1996

[30] Foreign Application Priority Data

Aug. 31, 1995 [JP] Japan .................................. 7-223181

[51] Int. Cl.⁶ .............................. G11B 3/70; G11B 17/22
[52] U.S. Cl. ............................ 369/275.4; 369/32; 369/59
[58] Field of Search .................................. 369/47, 48, 49, 369/50, 59, 124, 44.26, 32, 33, 275.3, 275.4; 360/48, 49

[56] References Cited

U.S. PATENT DOCUMENTS 5,442,499  8/1995  Emori ................................ 369/44.26 X
5,452,284  9/1995  Miyagawa et al. ............. 369/275.3 X
5,508,985  4/1996  Fairchild et al. ........................ 369/48

Primary Examiner—Paul W. Huber
Attorney, Agent, or Firm—Limbach & Limbach L.L.P.

[57] ABSTRACT

An optical disk, an apparatus and a method for recording/ reproducing the optical disk use Gray coded address information. The hexadecimal data 0 to F correspond to the Gray codes. The Gray code consists of the upper address and the lower address. The four channels of the upper address and the four channels of the lower address are set so that one channel of each address is "1". With the change of the data from 0 to F, the channel of "1" in the lower address sequentially moves to the adjacent channel in the corresponding Gray code. Consequently, rapid seeking can be performed by detecting only the lower address.

3 Claims, 8 Drawing Sheets

FIG. 4

| DATA | GRAY CODE |
|------|-----------|
| 0 | 0001 1000 |
| 1 | 0001 0100 |
| 2 | 0001 0010 |
| 3 | 0001 0001 |
| 4 | 0010 0001 |
| 5 | 0010 0010 |
| 6 | 0010 0100 |
| 7 | 0010 1000 |
| 8 | 0100 1000 |
| 9 | 0100 0100 |
| A | 0100 0010 |
| B | 0100 0001 |
| C | 1000 0001 |
| D | 1000 0010 |
| E | 1000 0100 |
| F | 1000 1000 |

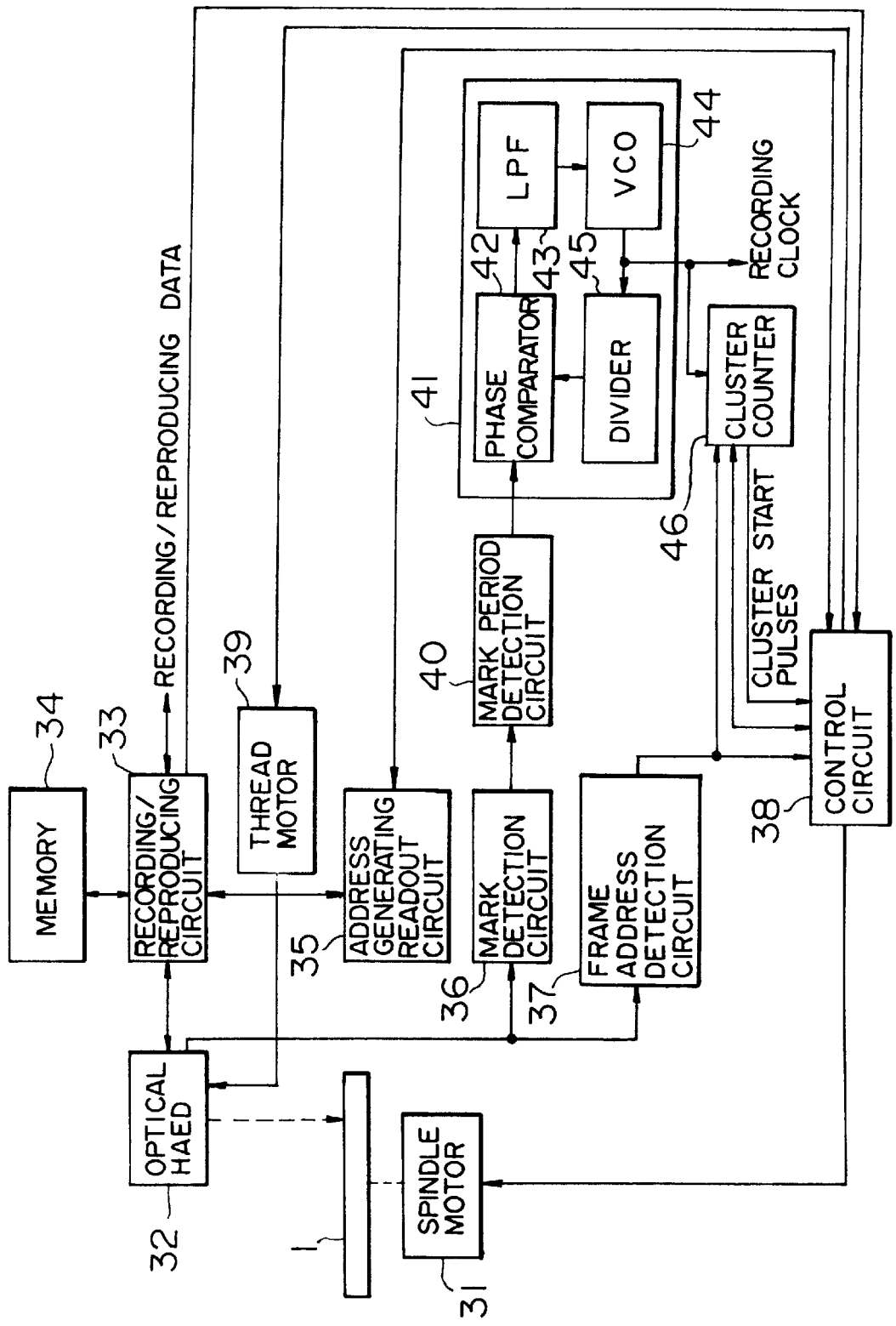

OPTICAL DISK, RECORDING/ REPRODUCING APPARATUS AND METHOD FOR RAPIDLY RECORDING/REPRODUCING DATA ON/FROM AN OPTICAL DISK USING GRAY CODING

BACKGROUND OF THE INVENTION

1. Field of the Invention

This invention generally relates to optical discs, recording/reproducing apparatuses and methods for the optical discs. In particular, it relates to an optical disc, an apparatus and a method for rapidly recording data on the optical disc on which a groove, wobbled as address information, is formed, or for rapidly reproducing data from the optical disc.

2. Description of the Related Art

To record data on an optical disc, it is necessary to record address information on the optical disc so as to record the data in position. According to a conventional method for recording address information on a recording/reproducing optical disc, a pre-groove that is spirally formed on the disc and is used for tracking is wobbled corresponding to the address information.

In other words, tracks for recording data are formed as a pre-groove such that the sides of the pre-groove are wobbled corresponding to the address information. By using this structure, an address can be read from wobbling information, and the data can be recorded in position.

However, for seeking it is necessary to position an optical head on a track, and to reproduce the a dress recorded on the track. The seek time accordingly lengthens. In particular, when the upper bits in the track address are incremented, all the lower bits change. The address is thus hardly detected, and is not preferred as access information. Accordingly, the seeking cannot be rapidly performed.

SUMMARY OF THE INVENTION

To solve the above problems, the present invention is achieved. It is an object of the present invention to provide an optical disc on which addresses are recorded in a wobbled groove, and an apparatus and a method for rapidly recording data on the disc or rapidly reproducing data from the disc.

In accordance with an aspect of the present invention, the foregoing object is achieved through the provision of an optical disc on which a groove, wobbled corresponding to address information, is previously formed, the groove being formed such that it is wobbled corresponding to the address information converted into the Gray code.

The address information may includes at least: data corresponding to a synchronizing signal; data corresponding to a track address; data corresponding to a frame address; and data corresponding to a code used for error detection.

In the groove wobbled a synchronizing mark area is formed in each predetermined amount of information area.

In the synchronizing mark area a signal having a predetermined frequency may be recorded, and within the synchronizing mark area a synchronizing mark may be recorded at a frequency different from the predetermined frequency.

In accordance with another aspect of the present invention, the foregoing object is achieved through the provision of an optical disc recording/reproducing apparatus for recording data on an optical disc on which a groove, wobbled corresponding to address information, is previously formed, and for reproducing data recorded on the disc, comprising: means for detecting a wobbling signal from the disc including the groove wobbled corresponding to the address information converted into the Gray codes, on which groove a synchronizing mark is formed in a plurality of frames wobbled; means for detecting a Gray code from the detected wobbling signal; means for detecting a synchronizing mark from the detected wobbling signal; and recording/reproducing means for reproducing data recorded in a predetermined position of the tracks on the disc, or for recording data in a predetermined position of the tracks on the optical disc, based on the Gray code and the synchronizing mark both detected by the respective means.

The optical disc recording/reproducing apparatus may further comprise a PLL circuit for extracting a clock, based on the output of the means for detecting a synchronizing mark from the detected wobbling signal.

In accordance with a further aspect of the present invention, the foregoing object is achieved through the provision of a method of reading wobbling information from an optical disc on which a groove, wobbled corresponding to address information, is previously formed, comprising the steps of: detecting a wobbling signal from an optical disc including the groove wobbled corresponding to the address information converted into the Gray codes, on which groove a synchronizing mark is formed in a plurality of frames wobbled; detecting the Gray code from the detected wobbling signal; and detecting a synchronizing mark from the detected wobbling signal.

The method may further comprises the step of determining whether or not the detected synchronizing mark has a constant periodicity.

In accordance with a still further aspect of the present invention, the foregoing object is achieved through the provision of a method of forming a groove on an optical disc, comprising the steps of: generating a wobbling signal by the modulation of a signal having a predetermined frequency by a signal in which address information is converted into the Gray codes; generating a synchronizing signal at the timing of forming a synchronizing mark; combining both the wobbling signal and the synchronizing mark signal; and recording the groove on the disc, based on the combined signal.

The step of generating the wobbling signal may be executed by performing the bi-phase modulation of the signal having the predetermined frequency by the signal in which the address information is converted into the Gray codes, and performing the frequency modulation of the signal having the predetermined frequency by the bi-phase modulated signal.

BRIEF DESCRIPTION OF THE DRAWINGS

FIG. 4 is a table of the relation between the data and the Gray code, used for showing a method of converting into the Gray code.

FIG. 10 is a block diagram of an apparatus for recording/reproducing an optical disc in accordance with an embodiment of the present invention.

DESCRIPTION OF THE PREFERRED EMBODIMENTS

Figure 1:
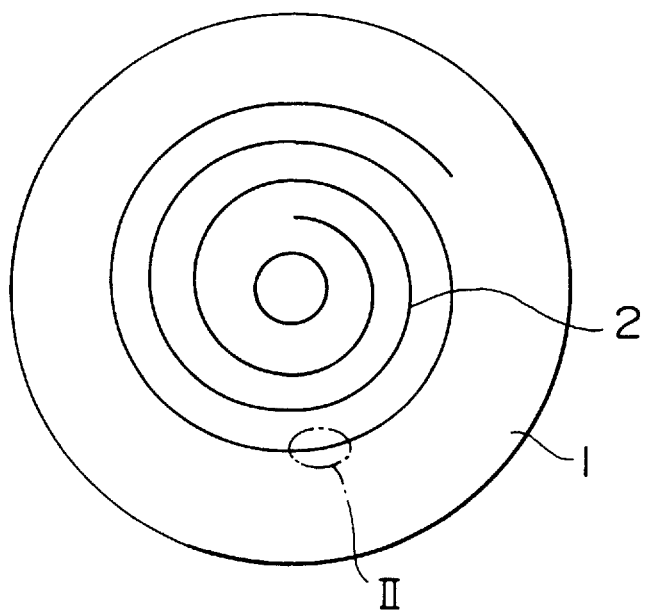
FIG. 1 is a schematic plan view illustrating an optical disc of the present invention, on which a groove is wobbled.

By referring to FIG. 1 illustrating a plan view of an optical disc in accordance with an embodiment of the present invention, a disc 1 (optical disc) has a groove 2 that is spirally formed thereon from the center to the circumference. It goes without saying that this groove may be concentrically formed.

Figure 2:
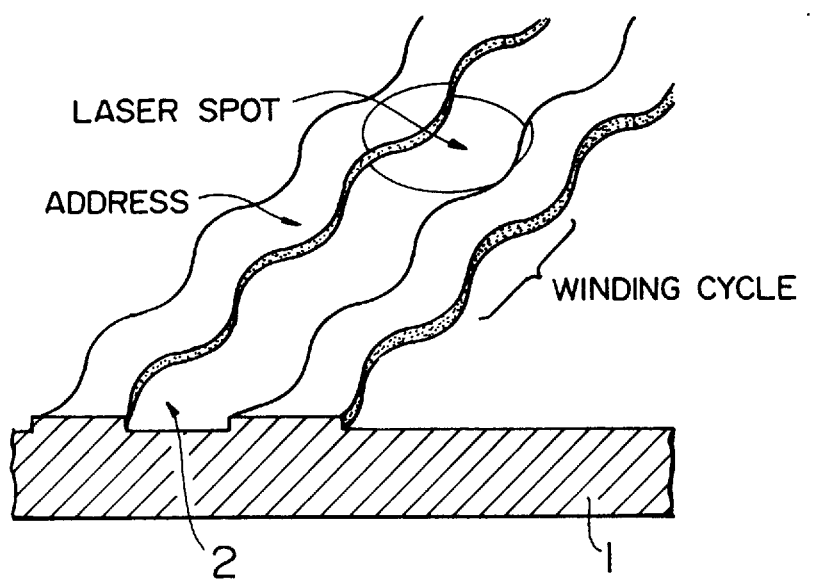
FIG. 2 is a perspective view illustrating enlarged part of the optical disc shown in FIG. 1, in which the groove is wobbled.

The right and left sides of the groove 2 shown in FIG. 1, part of which is enlarged and shown in FIG. 2, are wobbled corresponding to Gray codes as described below, so that the groove 2 winds through the disc 1 in a predetermined period. One track includes a plurality of wobbling address frames that have a structure as shown in FIG. 3.

Figure 3:
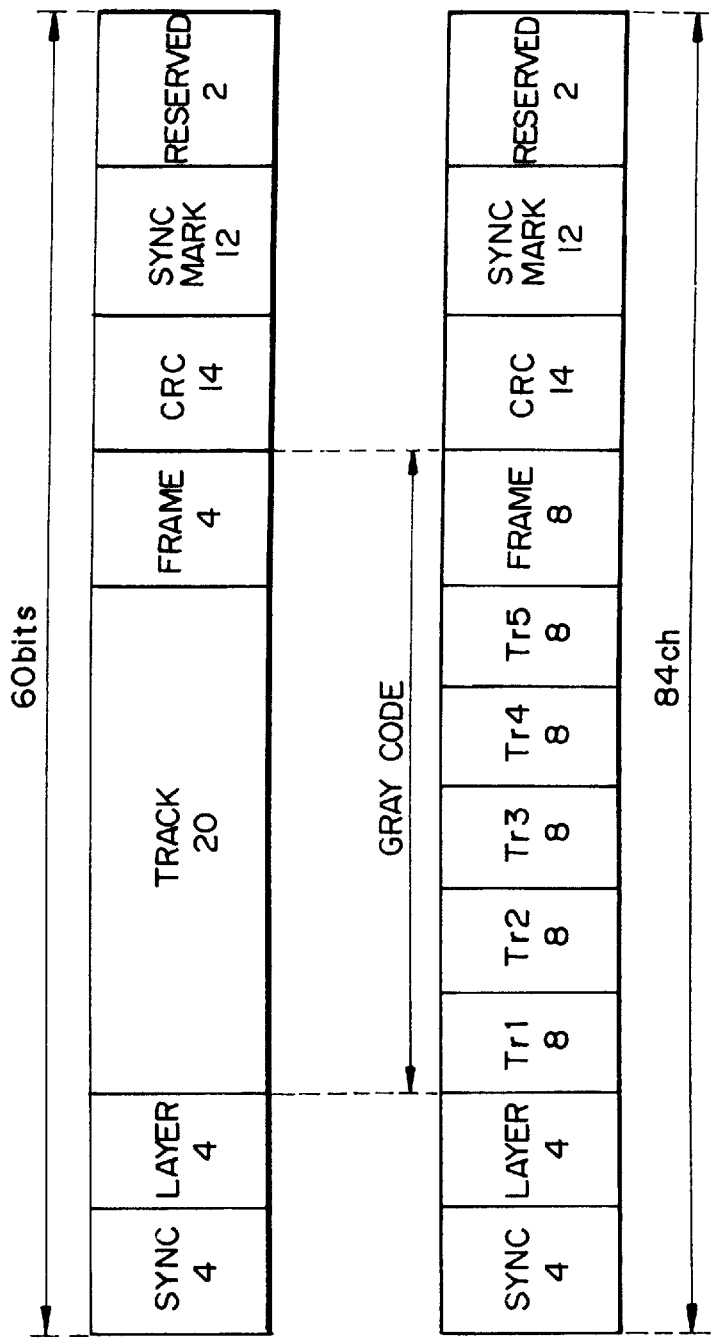
FIG. 3 is a chart showing an example of a wobbling address frame converted into a Gray code.

By referring to FIG. 3 showing an example of the wobbling address frame, the wobbling address frame consists of 60 bits. The first four bits represent a synchronizing signal (Sync) meaning the start of the wobbling address frame. The following four bits represent information meaning one of a plurality of recording layers if the layers are included in the disc 1. The following 20 bits represent a track address. The following four bits represent a frame number. The following 14 bits represent an error correcting code (CRC), in which an error detecting code excluding the synchronizing signal (Sync) and a clock synchronizing mark area (Sync mark) is recorded. The following 12 bits represent the clock synchronizing mark area (Sync mark). The last two bits represent reserved bits (Reserved) for another purpose in future.

For example, each track has eight wobbling address frames, which are recorded in the constant angular velocity disc form having a constant angular velocity of revolution.

FIG. 4 shows an example of a conversion table for converting the address information into the Gray codes. For better understanding, a unit of information that is converted into Gray codes is called a "channel". The Gray code consists of upper four channels and lower four channels each having a code in which one of four channel is "1". That is, predetermined one channel of four channels is "1", and the remaining three channels are "0". Thus, the upper channels and the lower channels have only one pattern of the following four patterns: "0001", "0010", "0100", and "1000". The upper channels and the lower channels can respectively have the four patterns. Therefore, eight channels consisting of both the upper channels and the lower channels can express 16 values of hexadecimal numbers 0 to F.

From the address information included in the wobbling address frame shown in FIG. 3, the track address and the frame address are converted into Gray codes, based on the conversion table shown in FIG. 4. At first, since the track address consists of 20 bits, it is divided into five groups of four bits, which are groups Tr1 to Tr5. Each group consists of four bits. Subsequently, the respective groups Tr1 to Tr5 are converted into Gray codes each consisting of 8 channels, based on the conversion table shown in FIG. 4. On the other hand, since the frame address consists of four bits, it is converted into a Gray code of 8 channels, based on the conversion table shown in FIG. 4.

In accordance with this manner, the track address of 20 bits is converted into Gray codes of 40 channels, and the frame address of four bits is converted into Gray codes of eight channels. The remaining address information becomes channels that correspond to the number of the bit of the information. As a result, the whole address frame is converted into Gray codes of 84 channels.

When the Gray codes shown in FIG. 4 correspond to the hexadecimal numbers 0 to F, as the data changes from the hexadecimal number 0 to F, the channel of "1" moves to the adjacent channel by one channel in the lower four channels of the Gray codes corresponding to the change. When the data changes from the hexadecimal number F to 0, the lower channels remain unchanged and the channel of "1" moves to the adjacent channel by one channel in the upper four channels. By defining the number of the channels or bits that changed as "information variation", the information variation between the adjacent channels in the correspondence given abode is expressed as not more than 2 in the lower four channels.

Conventionally, the data 0 is expressed as "0000", and the data F is expressed as "1111", the information variation when the data changes from F to 0 is 4. In addition, the data 0 is expressed as "0000" in which all the bits are zero, and therefore may hardly be detected as information.

As described above, by converting the data into the corresponding Gray codes, the information variation can be reduced to enable easy detection of information. Also, the Gray coded information does not have all zero in the upper channels or the lower channels, which also enable easy detection of information.

For example, when an optical head moves to an adjacent track to reproduce a track address recorded therein in a condition such as the seeking condition, if the track address is Gray coded, the lower channels of the Gray code corresponding to the track address sequentially change by one channel. Consequently, by detecting the lower channels, it can be recognized that the optical head has moved to the adjacent track. Thereby, the optical head can move to a predetermined track in order to perform seeking.

In accordance with the present invention, by converting the track address and the frame address into the Gray codes, seeking can be performed with the lower bits detected. Accordingly, rapid access to a target frame in a target track is realized.

Figure 5:
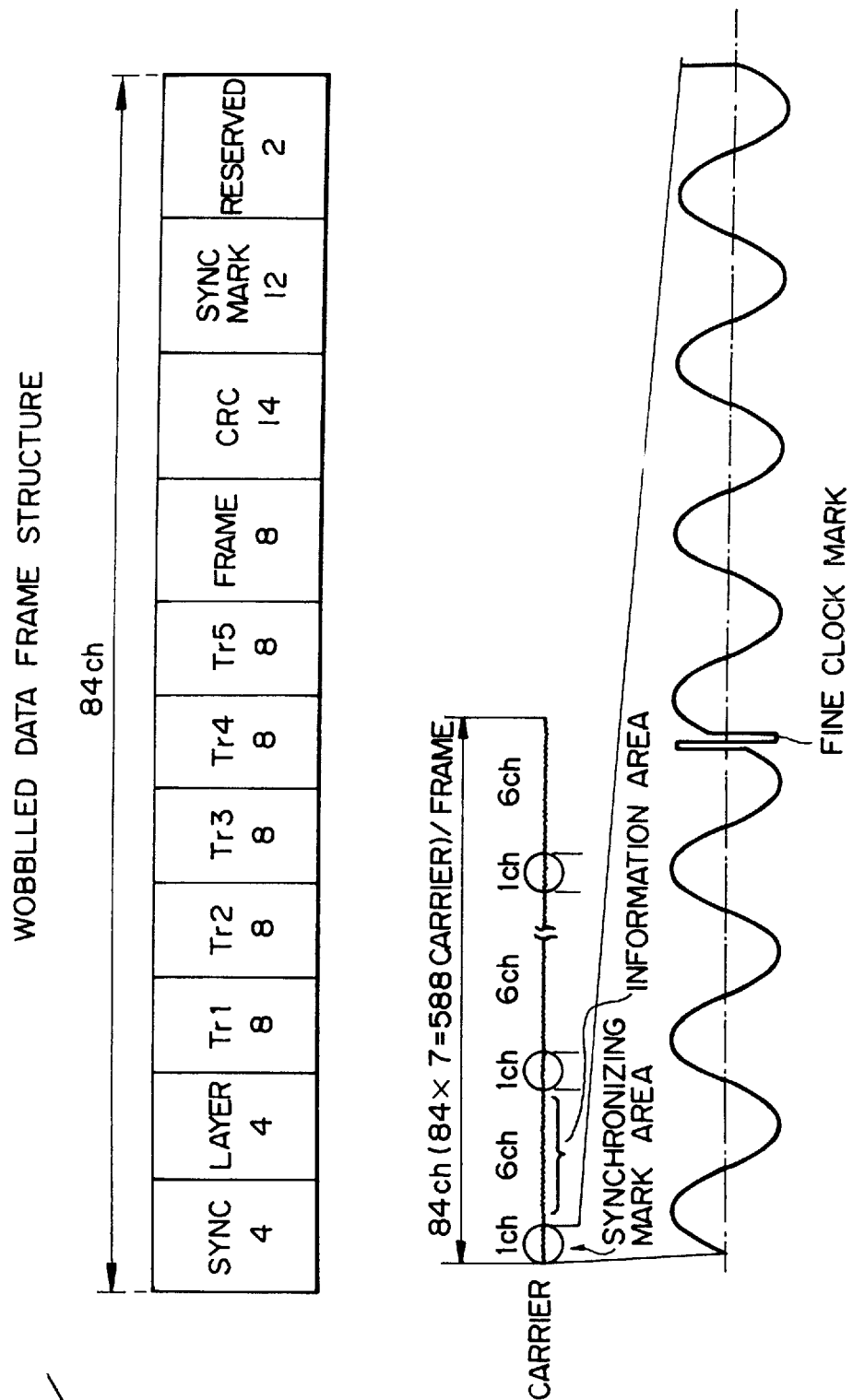
FIG. 5 is a chart showing fine clock mark areas and a fine clock mark.

FIG. 5 shows fine clock mark areas and a fine clock mark. On the assumption that the data of 84 channels is recorded in each channel and that one channel has seven carriers included in a predetermined frequency signal, as shown in FIG. 5, it is thus considered that one frame has 588 (=84×7) carriers. When the optical disc 1 revolves at, e.g., 1200 r p.m., the frequency of this carrier is 94.08 (=(588×8×1200/60)/1000) kHz.

As shown in FIG. 5, in the wobbling address frame shown in FIG. 3, each clock synchronizing mark area or fine clock mark area is assigned to one channel in seven channels of the address information. In other words, data is recorded at a cycle of seven channels. The first channel of the seven channels corresponds to seven carriers including a fine clock mark, and the other six channels correspond to an interval modulated by substantial address data that does not include any fine clock mark. Consequently, in one frame 12 (=84/7) fine clock marks and 72 (=84×6/7) data are recorded, and therefore in one revolution (one track) 96 (=12×8) fine clock marks are recorded.

The bi-phase modulation of the Gray code corresponding to the address information is performed, and the Gray code is recorded such that the pre-groove is wobbled by frequency modulation. In the fine clock area the wobbling frequency of the pre-groove is set to the central frequency of the modulation frequency of the Gray code corresponding to the address information. Otherwise it is set to a frequency higher than the modulation frequency of the Gray code.

When eight to fourteen modulation (EFM) that is employed in compact discs is used for modulating the recorded or reproduced data, the fine clock mark is wobbled by one wavelength in a mark length of six to eight cycles, as shown in FIG. 5.

Figure 6:
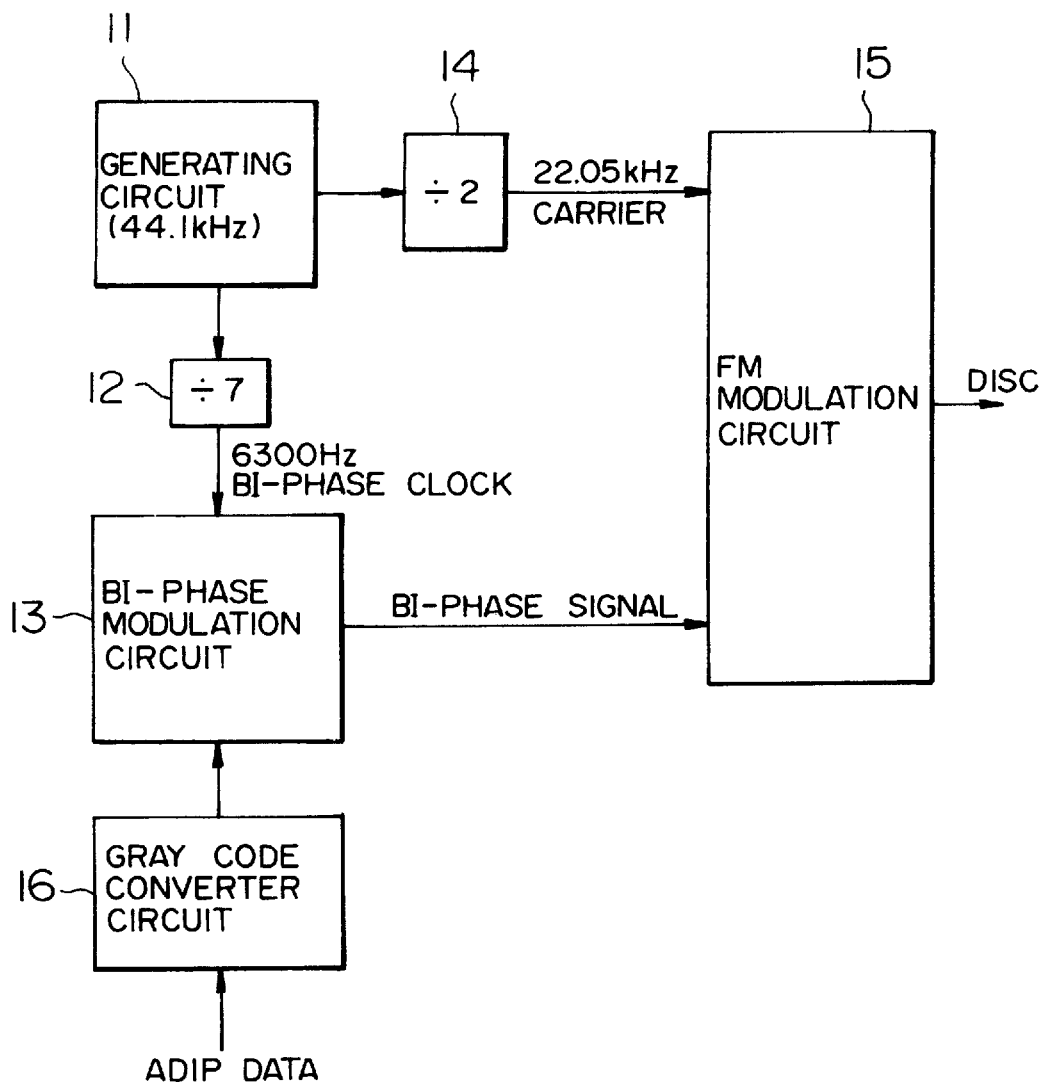
FIG. 6 is a block diagram of a wobbling signal generator.

FIG. 6 is a block diagram of a wobbling signal generator. The generator generates a wobbling signal in order that the groove 2 is wobbled. A signal generating circuit 11 generates a signal that has, e.g., a frequency of 44.1 kHz. This frequency of 44.1 kHz is the same as that of the sampling clock for sampling audio data recorded in a Mini-Disc (trademark).

The signal generated by the generating circuit 11 is supplied to a divider circuit 12. The divider circuit 12 divides the supplied signal by seven, and the divided signal is supplied as a bi-phase clock signal to a bi-phase modulation circuit 13. The bi-phase modulation circuit 13 is also supplied with a Gray code obtained by converting address in pre-groove (ADIP) data with a Gray code converter circuit 16.

This ADIP data corresponds to the wobbling address frame as shown in FIG. 5.

The bi-phase modulation circuit 13 performs the bi-phase modulation of the bi-phase clock from the divider circuit 12, using the Gray code supplied by the Gray code converter circuit 16, and outputs the resulting bi-phase signal to a FM modulation circuit 15. The FM modulation circuit 15 is also supplied with a carrier having a frequency of 22.05 kHz, obtained by dividing the 44.1 kHz signal from the generating circuit 11 by two. The FM modulation circuit 15 performs the frequency modulation of the 22.05 kHz carrier from the divider circuit 14, using the bi-phase signal from the bi-phase modulation circuit 13, and outputs the resulting FM signal. The right and left sides of the groove 2 in the disc 1 are formed such that they are wobbled corresponding to the FM signal.

Figure 7:
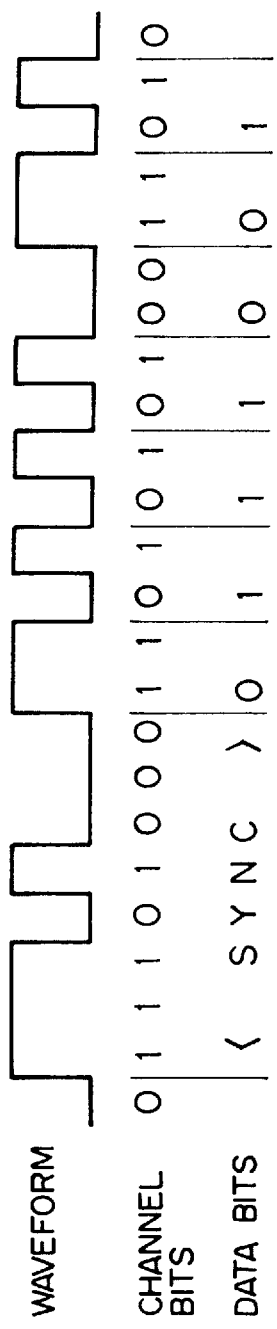
FIG. 7 is a waveform chart showing a bi-phase signal outputted by a bi-phase modulation circuit in the wobbling signal generator shown in FIG. 6.
Figure 8:
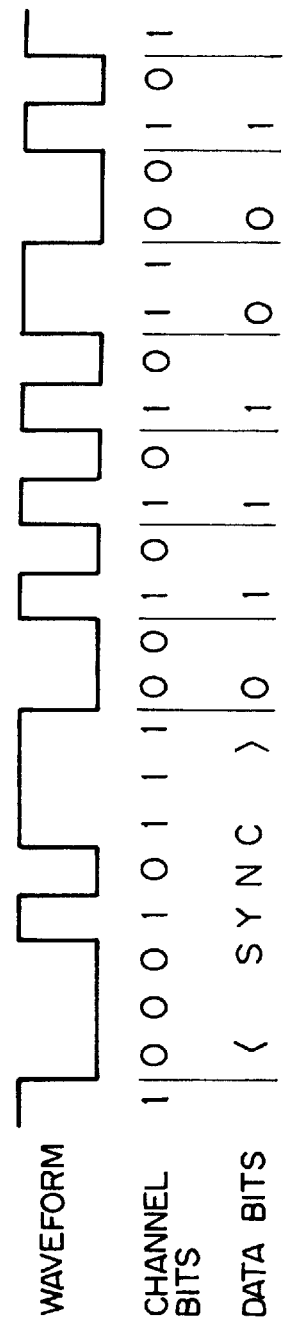
FIG. 8 is a waveform chart showing another bi-phase signal outputted by a bi-phase modulation circuit in the wobbling signal generator shown in FIG. 6.

By referring to FIGS. 7 and 8 showing examples of the bi-phase signal outputted by the bi-phase modulation circuit 13, data bits are converted into channel bits by bi-phase modulation. A synchronizing pattern included in each waveform, denoted by "SYNC", is considered out of the rules, which do not appear in the modulation. Each waveform denoted by "WAVEFORM" is formed such that the channel bits are converted into the patterns of "1" and "0".

In this embodiment, as shown in FIG. 7, when the first bit is "0", the synchronizing pattern becomes "11101000", while, as shown in FIG. 8, when the first bit is "1", the synchronizing pattern becomes "00010111".

Figure 9:
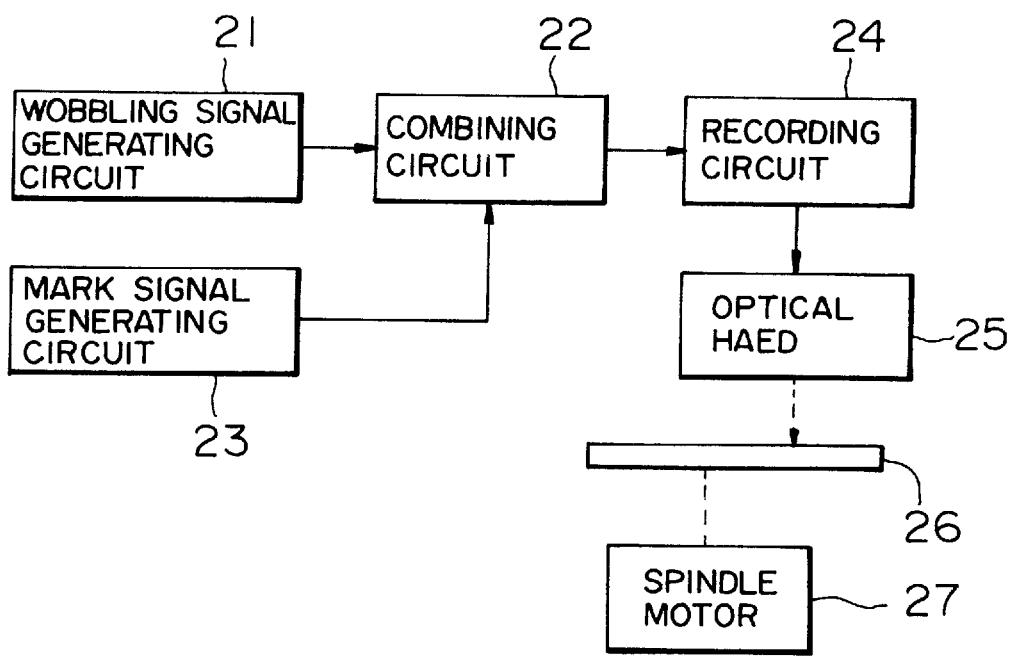
FIG. 9 is a block diagram of a recording apparatus for producing a disc having a pre-groove.

FIG. 9 is a block diagram of a recording apparatus for produce the disc 1 having the groove 2. A wobbling signal generating circuit 21 has the same structure as that shown in FIG. 6, and outputs a FM signal to a combining circuit 22. A mark signal generating circuit 23 generates a mark signal at the timing of forming a synchronizing mark is formed, and outputs it to the combining circuit 22. The combining circuit 22 combines both the FM signal from the wobbling signal generating circuit 21 and the mark signal from the mark signal generating circuit 23, and outputs the combined signal to a recording circuit 24. The recording circuit 24 controls an optical head 25 in accordance with the combined signal, and generates a laser beam for forming the pre-groove and the synchronizing mark on an original disc 26. A spindle motor 27 revolves the original disc 26 at a predetermined speed.

In other words, in accordance with the signal obtained by combining the FM signal generated by both the wobbling generating circuit 21 and the mark signal outputted by the mark signal generating circuit 23, the optical head 25 emits the laser beam onto the original disc 26 that is being revolved at the predetermined speed by the spindle motor 27.

The original disc 26 is developed, from which a stamper is produced. A plurality of discs, which is the same as the disc 1, are produced as replicas of the stamper. In accordance with this manner, it is possible to obtain the disc 1 on which the groove 2 having the above-described fine clock marks is formed.

FIG. 10 is a block diagram of an optical disc recording/reproducing apparatus. The apparatus records data in the obtained disc 1 or reproduces data therefrom. A spindle motor 31 revolves the disc 1 at a predetermined speed. An optical head 32 emits a laser beam onto the disc 1 to record data therein and to reproduce data therefrom.

Data to be recorded, from an apparatus as not shown in FIG. 10, is temporarily stored in a memory 34 by a recording/reproducing circuit 33 (recording/reproducing means). When the memory 34 holds the data such for an amount corresponding to one cluster as a recording unit, the recording/reproducing circuit 33 reads out the data for one cluster, and modulates it in a predetermined manner before outputting the modulated data to the optical head 32. For example, one cluster may consists of eight sectors, and one sector may consists of 28 frames. The recording/reproducing circuit 33 also properly demodulates data from the optical head 32, and outputs the modulated data to the apparatus as not shown in FIG. 10.

An address generating readout circuit 35 generates an address to be recorded in tracks (the groove 2) in accordance with the control of a control circuit 38, and outputs the generated address to the recording/reproducing circuit 33. The recording/reproducing circuit 33 adds this address to the data from the apparatus as not shown, and outputs the resulting data to the optical head 32. When data reproduced from a track of the disc 1 by the optical head 32 includes an address data, the recording/reproducing circuit 33 separates it and outputs the separated address data to the address generating readout circuit 35. The address generating readout circuit 35 outputs the readout address to the control circuit 38.

The mark detection circuit 36 (detection means) detects a component corresponding to the fine clock mark, from a RF signal reproduced by the optical head 32. A frame address detection circuit 37 (readout means) reads out the Gray coded information corresponding to the address information included in the wobbling signal, from the RF signal reproduced by the optical head 32, so that frame address detection circuit 37 detects a frame address to supply it to a cluster counter 46.

A mark period detection circuit 40 determines whether detection pulses outputted by the mark detection circuit 36 when detects the fine clock mark have periodicity. In other words, the fine clock mark is generated in a constant period. Accordingly, the mark period detection circuit 40 determines whether the detection pulses from the mar detection circuit 36 are generated in this constant period or not. If the detection pulses are generated in the constant period, the mark period detection circuit 40 generates pulses that synchronizes with the detection pulses, and outputs the pulses to a phase comparator 42 of a PLL circuit 41 positioned in the subsequent stage. Otherwise, if the detection pulses are not generated in the constant period, the mark period detection circuit 40 generates dummy pulses at predetermined timing so that the subsequent PLL circuit 41 is not engaged in the condition in which an error phase appears.

The PLL circuit 41 includes a low-pass filter (LPF) 43, a voltage control oscillator (VCO) 44, and a divider 45, other than the phase comparator 42. The phase comparator 42 compares the phases of both the input from the mark detection circuit 40 and the input from the divider 45, and outputs the resulting phase error signal. The low-pass filter 43 compensates the phase of a phase error signal outputted by the phase comparator 42, and outputs the signal to the VCO 44, The VCO 44 generates a clock having a phase corresponding to the output from the LPF 43, and outputs it to the divider 45. The divider 45 divides the clock from the VCO 44 by a predetermined value, and outputs the divided result to the phase comparator 42.

The clock outputted by the VCO 44 is supplied to not only the divider 45 but also a cluster counter 46. The cluster counter 46 counts the number of the clocks outputted by the VCO 44 by putting its reference on the frame address supplied by the frame address detection circuit 37. When the counted number reaches a predetermined value that corresponds to the length of one cluster, the cluster counter 46 generates cluster start pulses and outputs them to a control circuit 38.

A thread motor 39 is controlled by the control circuit 38 to move the optical head 32 to a predetermined track position. The control circuit 38 controls the spindle motor 31 to revolve the disc 1 at a predetermined speed.

The operations of the respective sections when data is recorded will be described below. The optical head 32 emits the laser beam onto the optical disc 1, and outputs the RF signal obtained from the light reflected from the disc 1. After reading out the Gray coded information corresponding to the wobbling information (address information) from the outputted RF signal, the frame address detection circuit 37 outputs the track address and the frame address to the control circuit 38, and supplies them to the cluster counter 46. This RF signal is inputted to also the mark detection circuit 36, in which the fine clock mark is detected and supplied to the mark period detection circuit 40.

By determining whether the fine clock mark supplied by the mark detection circuit 36 has periodicity or not, the mark period detection circuit 40 generates the predetermined pulses corresponding to the determination, and outputs them to the PLL circuit 41. The output from 41 is supplied to the cluster counter 46.

The cluster counter 46 counts the number of the clocks that correspond to the fine clock signal supplied by the PLL circuit 41, based on the signal corresponding to both the track address and the frame address supplied by the frame address detection circuit 37. When the counted number reaches the predetermined number, the cluster counter 46 outputs the cluster start pulses.

The control circuit 38 detects the position of the fine clock mark, which is the reference position in one track, based on the relation between the frame address and the wobbling address frame both supplied by the frame address detection circuit 37. Putting the reference in the detected position enables access to a desired position on the track in accordance with a recording clock supplied by the VCO 44.

As described above, in this embodiment the track address is detected from the Gray coded wobbling address information. When the optical head moves to the adjacent track, the Gray code corresponding to the track address has the position of the channel of "1" in the lower address sequentially moved to adjacent channels, so that all channels in the lower address do not become zeros. Detecting the lower address therefore enables seeking a desired track. Accordingly, it is not necessary to detect both the upper address and the lower address for seeking, different from a conventional method, and therefore rapid access is realized.

The wobbling address frame in the embodiment has a structure as an example, and it may have another structure.

The definite numerical values used in the embodiment are examples, and thus other values may be used.

The conversion table in the embodiment is an example, but not limited thereto. Another conversion table may be defined in order that the address information is converted into the Gray code.

In the embodiment the apparatus for recording/reproducing the optical disc has been described, however the present invention may be applied to an apparatus for reproducing the optical disc.

The present invention may be applied to CD-ROMs, Mini-Discs, and so forth.

What is claimed is:

1. An optical disc on which a groove, wobbled corresponding to address information, is previously formed, said groove being formed such that said groove is wobbled corresponding to said address information converted into a Gray code sequence, wherein a synchronizing mark area is formed in each predetermined amount of information area, in said wobbled groove, and wherein a signal having a predetermined frequency is recorded in said synchronizing mark area, and within said synchronizing mark area a synchronizing mark is recorded at a frequency different from the predetermined frequency.

2. An optical disc according to claim 1, wherein said address information includes at least:

data corresponding to a synchronizing signal;

data corresponding to a track address;

data corresponding to a frame address; and data corresponding to a code used for error detection.

3. An optical disc on which a groove, wobbled corresponding to address information, is previously formed, said groove being formed such that said groove is wobbled corresponding to said address information converted into a gray code, wherein the gray code always comprises a "1", wherein a synchronizing mark area is formed in each predetermined amount of information area, in said wobbled groove, and wherein a signal having a predetermined frequency is recorded in said synchronizing mark area, and within said synchronizing mark area a synchronizing mark is recorded at a frequency different from the predetermined frequency.

* * * * *